(12) United States Patent
Masuda et al.

(10) Patent No.: US 11,174,826 B2
(45) Date of Patent: Nov. 16, 2021

(54) ENGINE (71) Applicant: IHI CORPORATION, Tokyo (JP)

(72) Inventors: Yutaka Masuda, Tokyo (JP); Yoshiyuki Umemoto, Aioi (JP); Jun Teramoto, Aioi (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/008,860

(22) Filed: Sep. 1, 2020

(65) Prior Publication Data
US 2020/0392929 A1 Dec. 17, 2020

Related U.S. Application Data (63) Continuation of application No. PCT/JP2019/010589, filed on Mar. 14, 2019.

(30) Foreign Application Priority Data

Mar. 16, 2018 (JP) .............................. JP2018-050007
Mar. 16, 2018 (JP) .............................. JP2018-050008

(51) Int. Cl.
*F02D 7/00* (2006.01)
*F02M 57/02* (2006.01)
(Continued)

(52) U.S. Cl.
CPC ........ *F02M 57/025* (2013.01); *F02M 59/105* (2013.01); *F02B 3/06* (2013.01);
(Continued)

(58) Field of Classification Search
CPC .. F02D 41/0002; F02D 41/38; F02D 13/0242; F02D 15/02; F02D 17/00; F02D 17/02; B63H 21/38; F02B 75/04
(Continued)

(56) References Cited

U.S. PATENT DOCUMENTS 3,842,715 A   10/1974  Maier
4,241,705 A * 12/1980  Karaba ................. F02B 75/044
                                              123/48 B
(Continued)

FOREIGN PATENT DOCUMENTS

CN         105899781 A      8/2016
DE     102007026312 A1     12/2008
(Continued)

OTHER PUBLICATIONS

International Search Report issued in Application No. PCT/JP2019/010589, dated May 21, 2019, 4 pages.
(Continued)

*Primary Examiner* — John Kwon
(74) *Attorney, Agent, or Firm* — Rothwell, Figg, Ernst & Manbeck, P.C.

(57) ABSTRACT

Provided is an engine, including: a cylinder; a piston accommodated in the cylinder; a combustion chamber facing the piston; a sliding portion (large-diameter portion) configured to perform a stroke motion together with the piston; a hydraulic surface of the sliding portion facing a side opposite to the combustion chamber; a hydraulic chamber, which the hydraulic surface faces; and an auxiliary hydraulic chamber, which communicates with the hydraulic chamber, and has a volume changeable in accordance with a hydraulic pressure in the hydraulic chamber.

8 Claims, 9 Drawing Sheets

(51) Int. Cl.
*F02M 59/10* (2006.01)
*F02B 3/06* (2006.01)
*F02B 75/02* (2006.01)
*F02M 47/02* (2006.01)
*F02M 59/46* (2006.01)

(52) U.S. Cl.
CPC ...... *F02B 2075/025* (2013.01); *F02M 47/027* (2013.01); *F02M 59/466* (2013.01)

(58) Field of Classification Search
USPC .......... 123/481, 198 D, 198 DB, 48 B, 78 E
See application file for complete search history.

(56) References Cited

U.S. PATENT DOCUMENTS

| | | | |
|---|---|---|---|
| 11,098,620 B2 * | 8/2021 | Masuda | F02B 75/04 |
| 2007/0175422 A1 * | 8/2007 | Takahashi | F02D 15/02 |
| | | | 123/78 BA |
| 2009/0205615 A1 * | 8/2009 | Cannata | F02B 75/044 |
| | | | 123/48 B |
| 2012/0227705 A1 | 9/2012 | Ashizawa | |
| 2015/0167561 A1 | 6/2015 | Kim et al. | |
| 2016/0319738 A1 | 11/2016 | Yamada et al. | |
| 2016/0319739 A1 | 11/2016 | Yamada et al. | |
| 2020/0362774 A1 * | 11/2020 | Masuda | F02B 75/04 |
| 2020/0408160 A1 * | 12/2020 | Masuda | F02D 17/00 |
| 2021/0071550 A1 * | 3/2021 | Masuda | F02B 75/045 |

FOREIGN PATENT DOCUMENTS

| | | |
|---|---|---|
| EP | 2687707 A2 | 1/2014 |
| EP | 3296597 A1 | 3/2018 |
| GB | 1368721 A | 10/1974 |
| JP | S51-18006 B2 | 6/1976 |
| JP | H04-44450 U | 4/1992 |
| JP | 2008-038753 A | 2/2008 |
| JP | 2010-230000 A | 10/2010 |
| JP | 2011-220246 A | 11/2011 |
| JP | 5273290 B2 | 5/2013 |
| JP | 2014-020375 A | 2/2014 |
| JP | 2016-211680 A | 12/2016 |
| KR | 10-2016-0131320 A | 11/2016 |
| WO | 2015/108138 A1 | 7/2015 |
| WO | 2015/108182 A1 | 7/2015 |

OTHER PUBLICATIONS

Notice of Allowance for Japanese Patent Application No. 2018-050007; dated Apr. 20, 2021. (3 pages).

\* cited by examiner

ENGINE

CROSS REFERENCE TO RELATED APPLICATIONS

This application is a continuation application of International Application No. PCT/JP2019/010589, filed on Mar. 14, 2019, which claims priority to Japanese Patent Application No. 2018-050007 and Japanese Patent Application No. 2018-050008, filed on Mar. 16, 2018, the entire contents of which are incorporated by reference herein.

BACKGROUND ART

Technical Field

The present disclosure relates to an engine.

Related Art

An engine of a crosshead type is sometimes used as a marine engine. For example, in an engine described in Patent Literature 1, a sliding portion is arranged in a crosshead, and actuation of the sliding portion by hydraulic pressure causes a top dead center position of the piston to move. As a result, a geometrical compression ratio of the engine can be changed.

Moreover, when the maximum combustion pressure becomes excessively high in an engine, a combustion temperature increases, and NOx in exhaust gas consequently increases. Thus, in an engine described in Patent Literature 2, a hydraulic chamber is formed inside a piston. When the pressure in a combustion chamber increases, working oil is discharged from the hydraulic chamber, thereby pushing down a crown surface of the piston. As a result, the increase in maximum combustion pressure is suppressed.

CITATION LIST

Patent Literature

Patent Literature 1: JP 2014-020375 A
Patent Literature 2: JP 5273290 B2

SUMMARY

Technical Problem

When both of the above-mentioned mechanisms, that is, the mechanism configured to change the compression ratio and the mechanism configured to suppress the maximum combustion pressure are provided, the structure is complicated. This phenomenon occurs not only in the marine engine and the engine of the crosshead type, but also in other engines such as an engine for a vehicle.

In view of the above-mentioned problem, the present disclosure has an object to provide an engine capable of suppressing an increase in complexity of structure.

Solution to Problem

In order to solve the above-mentioned problem, according to one mode of the present disclosure, there is provided an engine, including: a cylinder; a piston accommodated in the cylinder; a combustion chamber facing the piston; a sliding portion configured to perform a stroke motion together with the piston; a hydraulic surface of the sliding portion facing a side opposite to the combustion chamber; a hydraulic chamber, which the hydraulic surface faces; and an auxiliary hydraulic chamber, which communicates with the hydraulic chamber, and has a volume changeable in accordance with a hydraulic pressure in the hydraulic chamber.

The engine may include a hydraulic pump connected to the hydraulic chamber.

The engine may include a small-diameter hole, which receives a partition piston provided so as to be slidable, and has an interior partitioned by the partition piston into the auxiliary hydraulic chamber and an accommodation chamber; and an elastic member configured to press the partition piston from the accommodation chamber side toward the auxiliary hydraulic chamber side.

The engine may include a large-diameter hole, which accommodates the sliding portion, includes a bottom surface opposed to the hydraulic surface, and forms the hydraulic chamber between the hydraulic surface and the bottom surface. The small-diameter hole is opened in the bottom surface of the large-diameter hole.

The engine may include a communication passage having one end and another end. When a position of the sliding portion is within a predetermined range in a stroke direction, the one end is opened to the hydraulic chamber. When the position of the sliding portion is in a direction away from the combustion chamber with respect to the predetermined range in the stroke direction, the one end is closed, and the another end is opened to the auxiliary hydraulic chamber.

The engine may include: a communication passage having one end opened to the hydraulic chamber; an auxiliary hydraulic chamber, to which another end of the communication passage is opened, and which has a volume changeable in accordance with a hydraulic pressure in the hydraulic chamber; and a communication mechanism configured to cause the hydraulic chamber and the auxiliary hydraulic chamber to communicate with each other when an index value, which is the hydraulic pressure in the hydraulic chamber or a pressure in the combustion chamber, exceeds a threshold value, and to cause the hydraulic chamber and the auxiliary hydraulic chamber not to communicate with each other when the index value is equal to or smaller than the threshold value.

The engine may further include: a hydraulic pump connected to the hydraulic chamber; and a compression ratio controller configured to control the hydraulic pump, to thereby change a top dead center position of the piston.

Effects of Disclosure

According to the engine of the present disclosure, it is possible to suppress the increase in complexity of structure.

DESCRIPTION OF EMBODIMENTS

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

Figure 1:
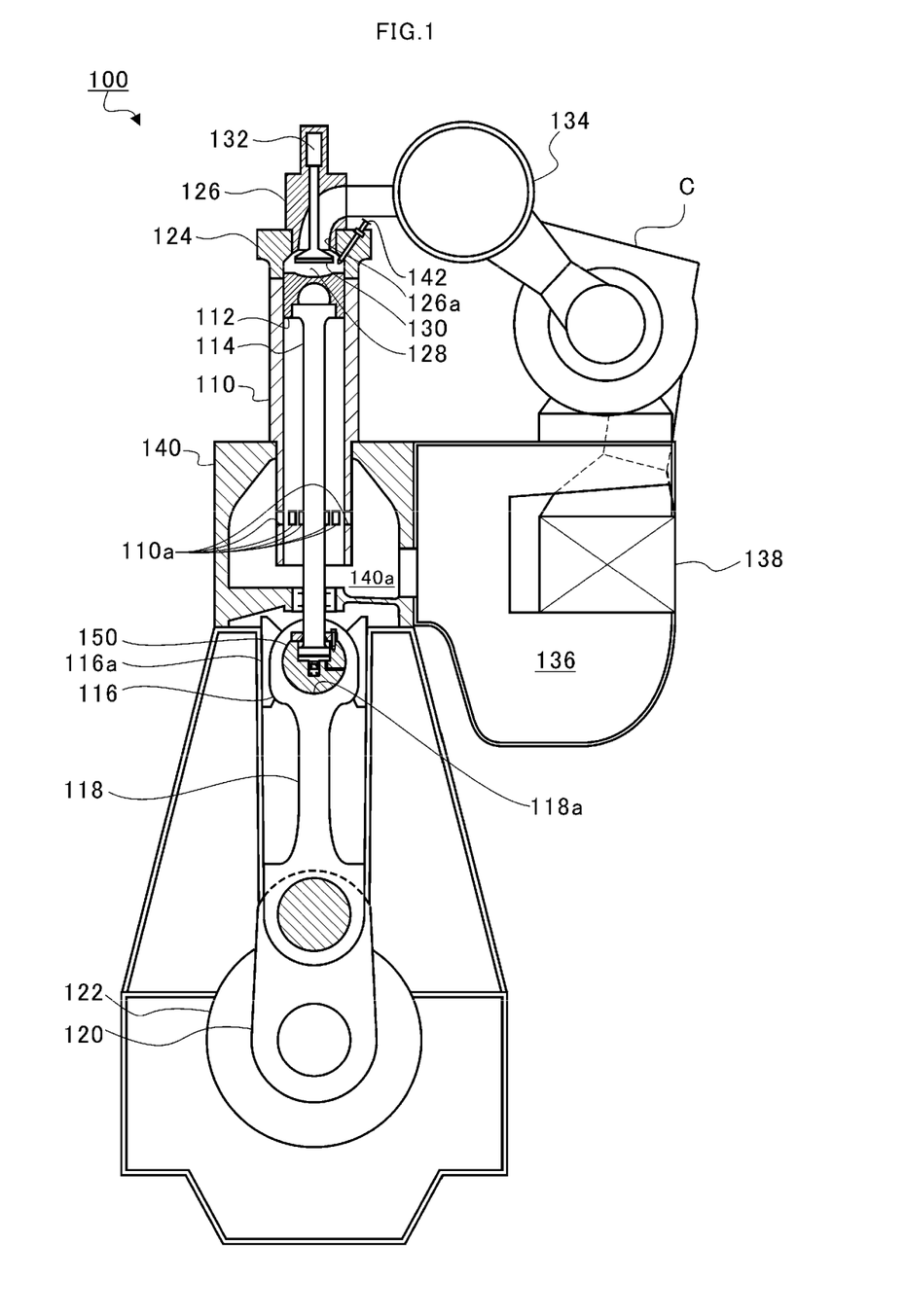
FIG. 1 is an explanatory view for illustrating an overall configuration of an engine.

FIG. 1 is an explanatory view for illustrating an overall configuration of an engine 100. As illustrated in FIG. 1, the engine 100 includes a cylinder 110, a piston 112, a piston rod 114, a crosshead 116, a connecting rod 118, a crankshaft 120, a flywheel 122, a cylinder cover 124, an exhaust valve cage 126, a combustion chamber 128, an exhaust valve 130, an exhaust valve drive device 132, an exhaust pipe 134, a scavenge reservoir 136, a cooler 138, a cylinder jacket 140, and a fuel injection valve 142.

The piston 112 is provided inside the cylinder 110. The piston 112 reciprocates inside the cylinder 110. One end of the piston rod 114 is attached to the piston 112. A crosshead pin 150 of the crosshead 116 is coupled to another end of the piston rod 114. The crosshead 116 reciprocates together with the piston 112. A movement of the crosshead 116 in a right-and-left direction (direction perpendicular to a stroke direction of the piston 112) in FIG. 1 is regulated by a guide shoe 116a.

The crosshead pin 150 is axially supported by a crosshead bearing 118a provided at one end of the connecting rod 118. The crosshead pin 150 supports one end of the connecting rod 118. The another end of the piston rod 114 and the one end of the connecting rod 118 are connected to each other through an intermediation of the crosshead 116.

Another end of the connecting rod 118 is coupled to the crankshaft 120. The crankshaft 120 is rotatable with respect to the connecting rod 118. When the crosshead 116 reciprocates along with the reciprocation of the piston 112, the crankshaft 120 rotates.

The flywheel 122 is mounted to the crankshaft 120. Rotations of the crankshaft 120 and the like are stabilized by inertia of the flywheel 122. The cylinder cover 124 is provided at a top end of the cylinder 110. The exhaust valve cage 126 is inserted through the cylinder cover 124.

One end of the exhaust valve cage 126 faces the piston 112. An exhaust port 126a is opened in the one end of the exhaust valve cage 126. The exhaust port 126a is opened to the combustion chamber 128. The combustion chamber 128 faces a crown surface of the piston 112. The combustion chamber 128 is formed inside the cylinder 110 so as to be surrounded by the cylinder cover 124, the cylinder 110, and the piston 112.

A valve body of the exhaust valve 130 is located in the combustion chamber 128. The exhaust valve drive device 132 is attached to a rod portion of the exhaust valve 130. The exhaust valve drive device 132 is arranged in the exhaust valve cage 126. The exhaust valve drive device 132 moves the exhaust valve 130 in the stroke direction of the piston 112.

When the exhaust valve 130 moves toward the piston 112 side to open, exhaust gas generated in the cylinder 110 after combustion is discharged from the exhaust port 126a. After the exhaust gas is discharged, the exhaust valve 130 moves toward the exhaust valve cage 126 side to close the exhaust port 126a.

The exhaust pipe 134 is attached to the exhaust valve cage 126 and a turbocharger C. An inside of the exhaust pipe 134 communicates with the exhaust port 126a and a turbine of the turbocharger C. The exhaust gas discharged from the exhaust port 126a is supplied to the turbine (not shown) of the turbocharger C through the exhaust pipe 134, and is then discharged to the outside.

Moreover, active gas is pressurized by a compressor (not shown) of the turbocharger C. In this state, the active gas is, for example, air. The pressurized active gas is cooled by the cooler 138 in the scavenge reservoir 136. A bottom end of the cylinder 110 is surrounded by the cylinder jacket 140. A scavenge chamber 140a is formed inside the cylinder jacket 140. The active gas after the cooling is forcibly fed into the scavenge chamber 140a.

Scavenging ports 110a are formed on a bottom end side of the cylinder 110. The scavenging port 110a is a hole passing from an inner peripheral surface to an outer peripheral surface of the cylinder 110. A plurality of scavenging ports 110a are formed at intervals in a circumferential direction of the cylinder 110.

When the piston 112 moves toward a bottom dead center position side with respect to the scavenging ports 110a, the active gas is sucked from the scavenging ports 110a into the cylinder 110 by a pressure difference between the scavenge chamber 140a and the inside of the cylinder 110.

Moreover, the fuel injection valve 142 is provided in the cylinder cover 124. A distal end of the fuel injection valve 142 is directed toward the combustion chamber 128 side. The fuel injection valve 142 injects a liquid fuel (fuel oil) into the combustion chamber 128. The liquid fuel is combusted, and expansion pressure generated by the combustion causes the piston 112 to reciprocate.

Figure 2:
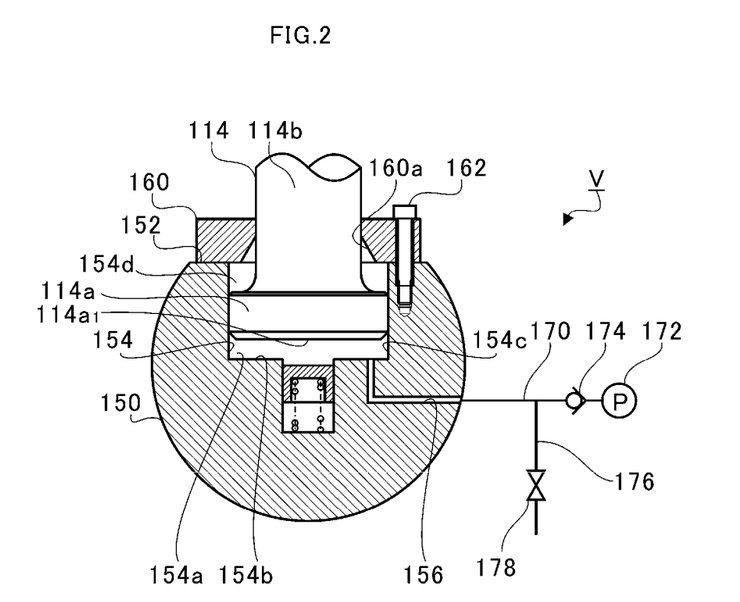
FIG. 2 is an extracted view for illustrating a coupling portion between a piston rod and a crosshead pin.

FIG. 2 is an extracted view for illustrating a coupling portion between the piston rod 114 and the crosshead pin 150. As illustrated in FIG. 2, a flat surface portion 152 is formed on an outer peripheral surface on the piston 112 side of the crosshead pin 150. The flat surface portion 152 extends in a direction substantially perpendicular to the stroke direction of the piston 112.

A pin hole (large-diameter hole) 154 is formed in the crosshead pin 150. The pin hole 154 is opened in the flat surface portion 152. The pin hole 154 extends from the flat surface portion 152 toward the crankshaft 120 side (lower side in FIG. 2) along the stroke direction.

A cover member 160 is provided on the flat surface portion 152 of the crosshead pin 150. The cover member 160 is attached to the flat surface portion 152 of the crosshead pin 150 by a fastening member 162. The cover member 160 covers the pin hole 154. A cover hole 160a passing in the stroke direction is formed in the cover member 160.

The piston rod 114 includes a large-diameter portion (sliding portion) 114a and a small-diameter portion 114b. An outer diameter of the large-diameter portion 114a is larger than an outer diameter of the small-diameter portion 114b. The large-diameter portion 114a is formed at the another end of the piston rod 114. The large-diameter portion 114a is inserted into (accommodated in) the pin hole 154 of the crosshead pin 150. The small-diameter portion 114b is formed at the one end side of the piston rod 114 with respect to the large-diameter portion 114a. The small-diameter portion 114b is inserted into the cover hole 160a of the cover member 160.

A hydraulic chamber 154a is formed inside the pin hole 154. The pin hole 154 is partitioned by the large-diameter portion 114a in the stroke direction. The large-diameter portion 114a is located on a top dead center position side of the piston 112 in the hydraulic chamber 154a. The hydraulic chamber 154a is a space defined on a bottom surface 154b side of the pin hole 154 partitioned by the large-diameter portion 114a. A hydraulic surface $114a_1$ of the large-diameter portion 114a facing a side (lower side of FIG. 2) opposite to the combustion chamber 128 faces the hydraulic chamber 154a and a bottom surface 154b of the pin hole 154. The hydraulic chamber 154a is formed between the hydraulic surface $114a_1$ and the bottom surface 154b.

A side wall of the hydraulic chamber 154a (that is, a side wall 154c of the pin hole 154) extends in the stroke direction. One end of an oil passage 156 is opened in the bottom surface 154b of the pin hole 154. Another end of the oil passage 156 is opened to an outside of the crosshead pin 150. A hydraulic pipe 170 is connected to the another end of the oil passage 156.

A hydraulic pump 172 communicates with the hydraulic pipe 170. That is, the hydraulic pump 172 is connected to the hydraulic chamber 154a. A check valve 174 is provided between the hydraulic pump 172 and the oil passage 156. A flow of working oil flowing from the oil passage 156 side toward the hydraulic pump 172 side is suppressed by the check valve 174. The working oil is forcibly fed (delivered) into the hydraulic chamber 154a from the hydraulic pump 172 through the oil passage 156.

A branch pipe 176 is connected to the hydraulic pipe 170 between the oil passage 156 and the check valve 174. A selector valve 178 is provided to the branch pipe 176. The selector valve 178 is, for example, an electromagnetic valve. The selector valve 178 is closed during an operation of the hydraulic pump 172. When the selector valve 178 is opened while the hydraulic pump 172 is stopped, the working oil is discharged from the hydraulic chamber 154a toward the branch pipe 176 side. The selector valve 178 communicates with an oil tank (not shown) on a side opposite to the oil passage 156. The discharged working oil is retained in the oil tank. The oil tank supplies the working oil to the hydraulic pump 172.

The large-diameter portion 114a slides on an inner peripheral surface of the pin hole 154 in the stroke direction in accordance with an oil amount of the working oil in the hydraulic chamber 154a. The large-diameter portion 114a slides with respect to the side wall 154c in accordance with an amount of the working oil in the hydraulic chamber 154a. As a result, the piston rod 114 moves in the stroke direction. The piston 112 moves (performs a stroke motion) together with the piston rod 114 (large-diameter portion 114a). When the amount of the working oil inside the hydraulic chamber 154a is increased, the top dead center position of the piston 112 moves toward the combustion chamber 128 side. When the amount of the working oil inside the hydraulic chamber 154a is reduced, the top dead center position of the piston 112 moves toward the bottom dead center position side. As a result, the top dead center position of the piston 112 becomes changeable.

That is, the engine 100 includes a compression ratio changing mechanism V. The compression ratio changing mechanism V includes the hydraulic chamber 154a and the large-diameter portion 114a of the piston rod 114 described above. The compression ratio changing mechanism V moves the top dead center position of the piston 112 so that the compression ratio is changeable.

The description has been given of the case in which the one hydraulic chamber 154a is provided. However, a space 154d on the cover member 160 side of the pin hole 154 partitioned by the large-diameter portion 114a may also be a hydraulic chamber. This hydraulic chamber may be used together with the hydraulic chamber 154a or may be used individually.

Figure 3:
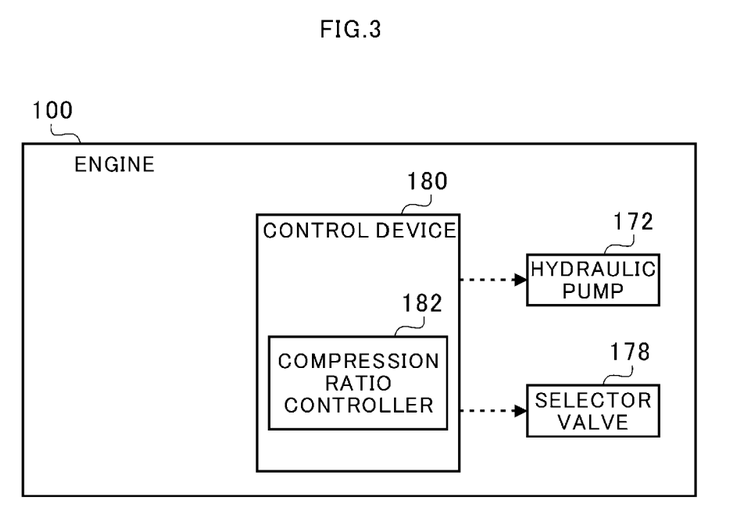
FIG. 3 is a functional block diagram for illustrating the engine.

FIG. 3 is a functional block diagram for illustrating the engine 100. In FIG. 3, a configuration relating to control for the compression ratio changing mechanism V is mainly illustrated. As illustrated in FIG. 3, the engine 100 includes a control device 180. The control device 180 is formed of, for example, an engine controller (ECU). The control device 180 is formed of a central processing unit (CPU), a ROM storing programs and the like, a RAM serving as a work area, and the like, and is configured to control the entire engine 100. Moreover, the control device 180 functions as a compression ratio controller 182.

The compression ratio controller 182 is configured to control the hydraulic pump 172 and the selector valve 178 to change (move) the top dead center position of the piston 112. In such a manner, the compression ratio controller 182 controls a geometrical compression ratio of the engine 100.

Figure 4A:
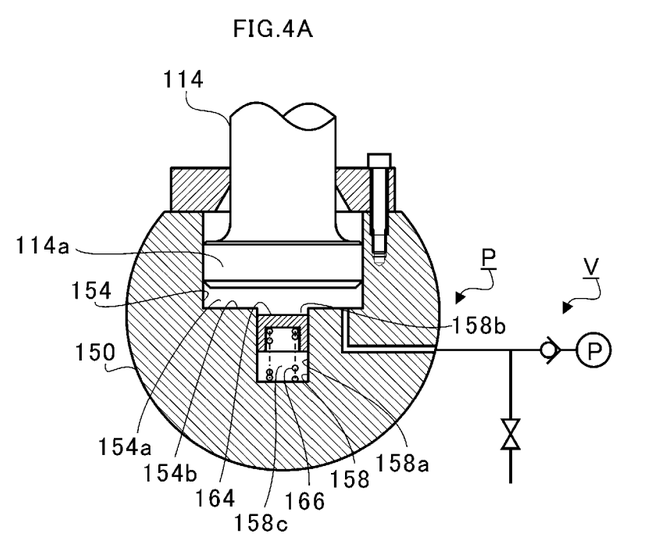
FIG. 4A and FIG. 4B are views for illustrating a combustion pressure suppression mechanism.
Figure 4B:
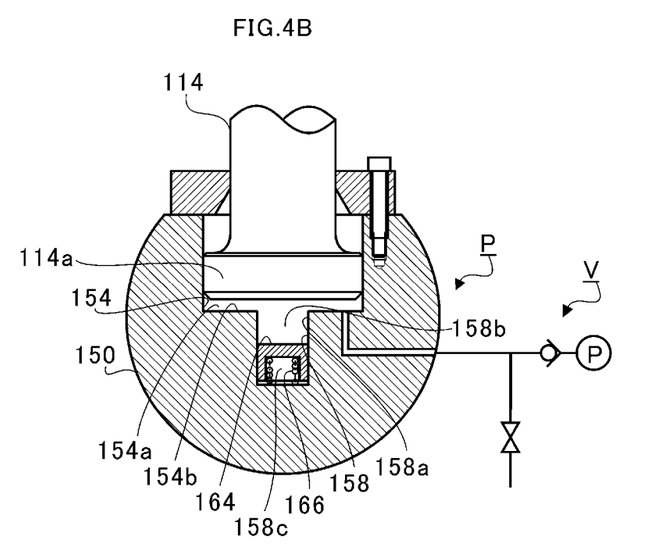

FIG. 4A and FIG. 4B are views for illustrating a combustion pressure suppression mechanism P. FIG. 4A and FIG. 4B are extracted views for illustrating the same portion as that of FIG. 2. As illustrated in FIG. 4A, the engine 100 includes the combustion pressure suppression mechanism P. The combustion pressure suppression mechanism P includes the above-mentioned hydraulic chamber 154a, a small-diameter hole 158, a partition piston 164, and an elastic member 166.

The small-diameter hole 158 is opened in the bottom surface 154b of the pin hole 154. The small-diameter hole 158 continuously extends from the hydraulic chamber 154a of the pin hole 154 in the stroke direction. That is, a side wall 158a of the small-diameter hole 158 extends in the stroke direction. An inner diameter of the small-diameter hole 158 is smaller than an inner diameter of the pin hole 154 (hydraulic chamber 154a).

The partition piston 164 is provided in the small-diameter hole 158 so as to be slidable. The partition piston 164 partitions the small-diameter hole 158 into an auxiliary hydraulic chamber 158b and an accommodation chamber 158c. The auxiliary hydraulic chamber 158b is located on the hydraulic chamber 154a side with respect to the partition piston 164. The accommodation chamber 158c is located on a side away from the hydraulic chamber 154a with respect to the partition piston 164.

The auxiliary hydraulic chamber 158b is continuous with the hydraulic chamber 154a. A part of the working oil supplied to the hydraulic chamber 154a flows into the auxiliary hydraulic chamber 158b. The partition piston 164 is pressed toward the accommodation chamber 158c side by the hydraulic pressure of the working oil.

The elastic member 166 is arranged in the accommodation chamber 158c. The elastic member 166 is formed of, for example, an elastic spring. The elastic member 166 presses the partition piston 164 from the accommodation chamber 158c side toward the auxiliary hydraulic chamber 158b side (hydraulic chamber 154a side or piston rod 114 side) against the hydraulic pressure of the working oil.

When the piston 112 is pressed toward the bottom dead center position side by the combustion pressure in the combustion chamber 128, the large-diameter portion 114a is pressed toward the hydraulic chamber 154a side, and the hydraulic pressure accordingly increases in the hydraulic chamber 154a. When the hydraulic pressure in the hydraulic chamber 154a increases, the partition piston 164 is pressed toward the accommodation chamber 158c side. Therefore, as illustrated in FIG. 4B, the partition piston 164 moves toward the accommodation chamber 158c side. As a result, the elastic member 166 is compressed, and an elastic force for pressing the partition piston 164 thus increases. The partition piston 164 stops at a position at which the pressing force of the hydraulic pressure and the pressing force of the elastic force balance each other.

As a result, the volume of the auxiliary hydraulic chamber 158b increases. As described above, the volume of the auxiliary hydraulic chamber 158b changes in accordance with the hydraulic pressure inside. Accordingly, the working oil flows from the hydraulic chamber 154a into the auxiliary hydraulic chamber 158b. The large-diameter portion 114a moves toward the bottom surface 154b side by an amount corresponding to a decrease in oil amount of the working oil in the hydraulic chamber 154a. Therefore, the piston 112 moves toward the bottom dead center position side. As a result, the combustion chamber 128 increases, and the maximum combustion pressure in the combustion chamber 128 is thus suppressed.

When the piston 112 moves toward the bottom dead center position side, and the pressure accordingly decreases in the combustion chamber 128, the hydraulic pressure decreases in the hydraulic chamber 154a. The pressing force of the hydraulic pressure for pressing the partition piston 164 becomes smaller than the pressing force of the elastic force, and the partition piston 164 accordingly moves toward the hydraulic chamber 154a side. The working oil flows from the auxiliary hydraulic chamber 158b into the hydraulic chamber 154a. As described above, the combustion pressure suppression mechanism P functions as an accumulator for the working oil.

Figure 5:
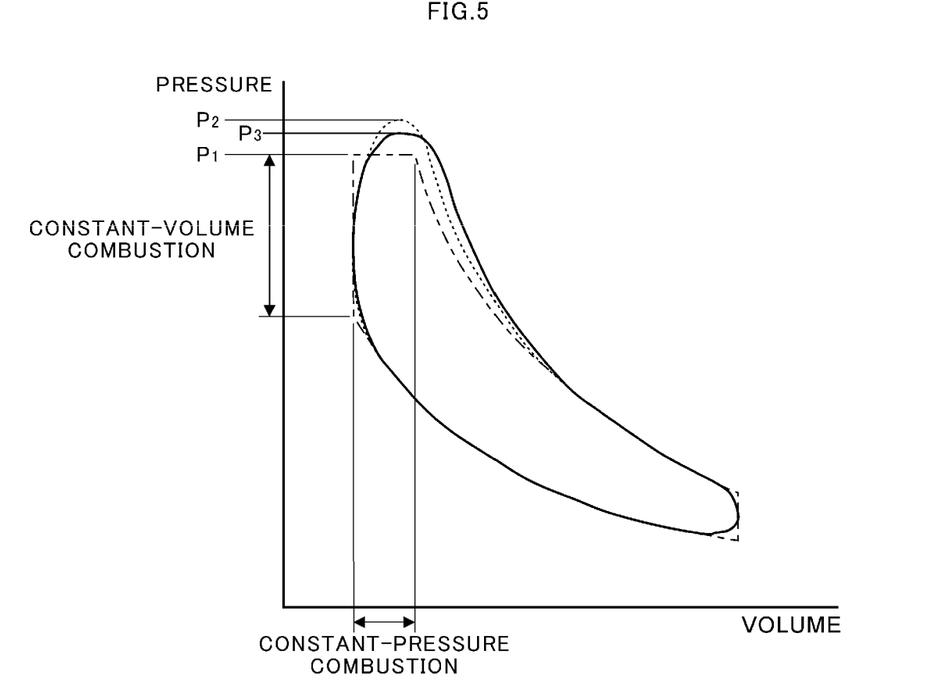
FIG. 5 is a graph for showing an example of a P-V diagram of the engine.

FIG. 5 is a graph for showing an example of a P-V diagram of the engine 100. In the example shown in FIG. 5, it is assumed that the selector valve 178 of the compression ratio changing mechanism V is closed, and the hydraulic pump 172 is stopped. As indicated by a one-dot chain line of FIG. 5, a theoretical combustion cycle of the engine 100 is the Sabathe cycle (mixed cycle), which is a combination of constant-volume combustion and constant-pressure combustion. However, in reality, as in a comparative example indicated by a broken line of FIG. 5, the constant-volume combustion and the constant-pressure combustion are not perfectly achieved. Specifically, the maximum combustion pressure $P_2$ of the comparative example is higher than the maximum combustion pressure $P_1$ of the Sabathe cycle. Therefore, the combustion temperature increases, and NOx contained in the exhaust gas accordingly increases.

In the engine 100, as described above, the maximum combustion pressure $P_3$ is suppressed by the combustion pressure suppression mechanism P to the pressure lower than the maximum combustion pressure $P_2$ of the comparative example. That is, the maximum combustion pressure $P_3$ becomes closer to the maximum combustion pressure $P_1$ of the Sabathe cycle. A part of the combustion cycle can be brought close to the constant-pressure combustion through the escape of the working oil to the auxiliary hydraulic chamber 158b in accordance with the pressure in the combustion chamber 128.

As described above, in the engine 100, the increase in combustion temperature is suppressed by the combustion pressure suppression mechanism P, and NOx contained in the exhaust gas is accordingly suppressed. Moreover, the maximum combustion pressure $P_3$ is suppressed, and strength of the members as high as that can withstand the maximum combustion pressure $P_2$ of the comparative example is not required. Further, as described above, the hydraulic chamber 154a is shared between the compression ratio changing mechanism V and the combustion pressure suppression mechanism P. Therefore, an increase in complexity of the structure can be suppressed compared with a case in which the hydraulic chamber 154a for the compression ratio changing mechanism V and the hydraulic chamber 154a for the combustion pressure suppression mechanism P are individually provided.

Moreover, when the compression ratio is increased by the compression ratio changing mechanism V, the maximum combustion pressure also increases. In the combustion pressure suppression mechanism P, a deformation amount of the elastic member 166 is proportional to the pressure in the combustion chamber 128. Therefore, when the compression ratio is increased to a high compression ratio by the compression ratio changing mechanism V, the elastic member 166 greatly deforms, and the increase in maximum combustion pressure is more likely to be suppressed. Meanwhile, when the compression ratio is low, the deformation amount of the elastic member 166 is small, and influence on the maximum combustion pressure is thus suppressed.

Figure 6A:
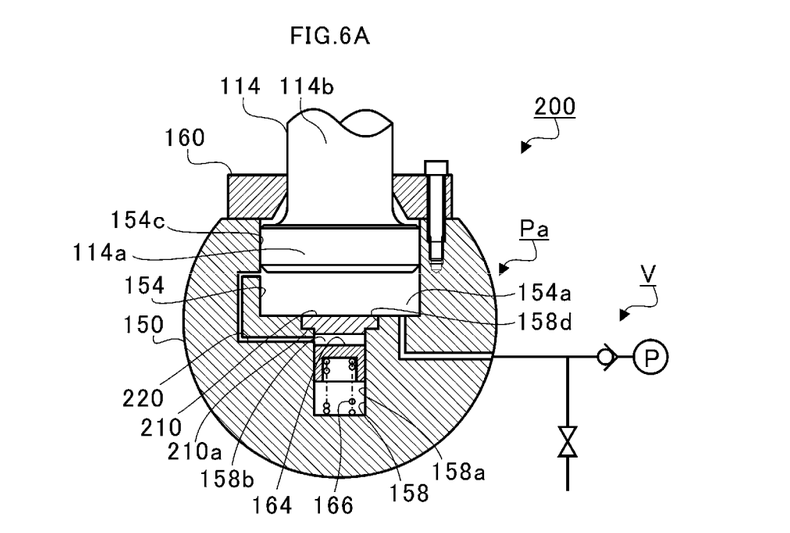
FIG. 6A and FIG. 6B are views for illustrating a first modification example.

FIG. 6A and FIG. 6B are views for illustrating a first modification example. As illustrated in FIG. 6A, in a combustion pressure suppression mechanism Pa of an engine 200 according to the first modification example, the small-diameter hole 158 is sealed by a lid member 210. The lid member 210 is configured to partition the pin hole 154 and the small-diameter hole 158 from each other. Specifically, a flange groove 158d is formed in an inner peripheral surface of an end portion of the small-diameter hole 158 on the pin hole 154 side. The lid member 210 includes a step portion 210a. The step portion 210a is fitted to the flange groove 158d.

A communication passage 220 is formed in the crosshead pin 150. One end of the communication passage 220 is opened in the side wall 154c of the pin hole 154. The auxiliary hydraulic chamber 158b is defined between the partition piston 164 and the lid member 210. Another end of the communication passage 220 is opened in the side wall 158a of the auxiliary hydraulic chamber 158b on the lid member 210 side.

Figure 6B:
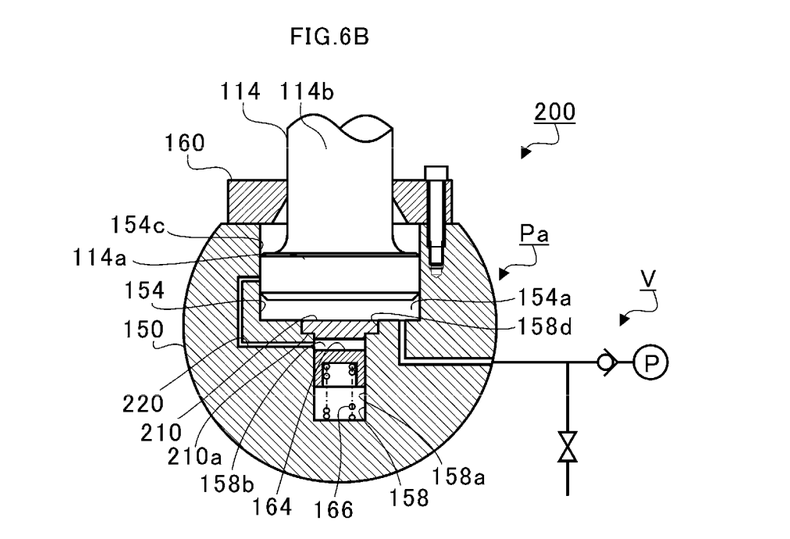

As illustrated in FIG. 6B, the one end of the communication passage 220 is closed by the large-diameter portion 114a depending on the position of the large-diameter portion 114a. Moreover, as illustrated in FIG. 6A, the one end of the communication passage 220 is not closed by the large-diameter portion 114a and is opened depending on the position of the large-diameter portion 114a. In other words, the large-diameter portion 114a is brought into any one of the case in which the large-diameter portion 114a is opposed to the opening of the communication passage 220 formed in the side wall 154c of the pin hole 154 in a direction orthogonal to the stroke direction and the case in which the large-diameter portion 114a is not opposed to the opening in the direction orthogonal to the stroke direction.

That is, a length from the one end of the communication passage 220 to the cover member 160 is larger than a thickness of the large-diameter portion 114a in the stroke direction. Therefore, when the large-diameter portion 114a is within a predetermined range, the one end of the communication passage 220 is opened to the hydraulic chamber 154*a*. Meanwhile, when the large-diameter portion 114*a* is on a side (auxiliary hydraulic chamber 158*b* side) away from the combustion chamber 128 with respect to the predetermined range, the one end of the communication passage 220 is closed.

The predetermined range includes, for example, a predetermined position illustrated in FIG. 6B and a range on the combustion chamber 128 side with respect to the predetermined position. However, the predetermined position may be on the piston 112 side (upper side in FIG. 6B) or on the auxiliary hydraulic chamber 158*b* side with respect to the position in FIG. 6B. The predetermined position is only required to be a position that allows at least the one end of the communication passage 220 to be closed by the large-diameter portion 114*a*.

As described above, when the large-diameter portion 114*a* is within the predetermined range, the communication passage 220 causes the hydraulic chamber 154*a* and the auxiliary hydraulic chamber 158*b* to communicate with each other. Therefore, when the large-diameter portion 114*a* is within the predetermined range, the hydraulic pressure in the hydraulic chamber 154*a* acts on the partition piston 164 on the auxiliary hydraulic chamber 158*b* side.

Moreover, when the large-diameter portion 114*a* is on the auxiliary hydraulic chamber 158*b* side with respect to the predetermined range, the hydraulic chamber 154*a* and the auxiliary hydraulic chamber 158*b* do not communicate with each other. Therefore, when the large-diameter portion 114*a* is on the auxiliary hydraulic chamber 158*b* side with respect to the predetermined range, the hydraulic pressure in the hydraulic chamber 154*a* does not act on the partition piston 164 on the auxiliary hydraulic chamber 158*b* side. That is, the combustion pressure suppression mechanism Pa does not function.

In this configuration, a compression ratio given when the large-diameter portion 114*a* is at the predetermined position is referred to as a predetermined compression ratio. Accordingly, this configuration can be considered as described below. That is, when the compression ratio is controlled so as to be equal to or larger than the predetermined compression ratio by the compression ratio changing mechanism V, the combustion pressure suppression mechanism Pa functions. Meanwhile, when the compression ratio is controlled so as to be smaller than the predetermined compression ratio by the compression ratio changing mechanism V, the combustion pressure suppression mechanism Pa does not function.

As described above, when the compression ratio is increased by the compression ratio changing mechanism V, the maximum combustion pressure also increases accordingly. When the compression ratio is increased so as to be larger than the predetermined compression ratio by the compression ratio changing mechanism V, the elastic member 166 greatly deforms, and the increase in maximum combustion pressure is thus suppressed. When the compression ratio is smaller than the predetermined compression ratio, the maximum combustion pressure does not decrease, and a decrease in thermal efficiency is thus avoided.

Figure 7A:
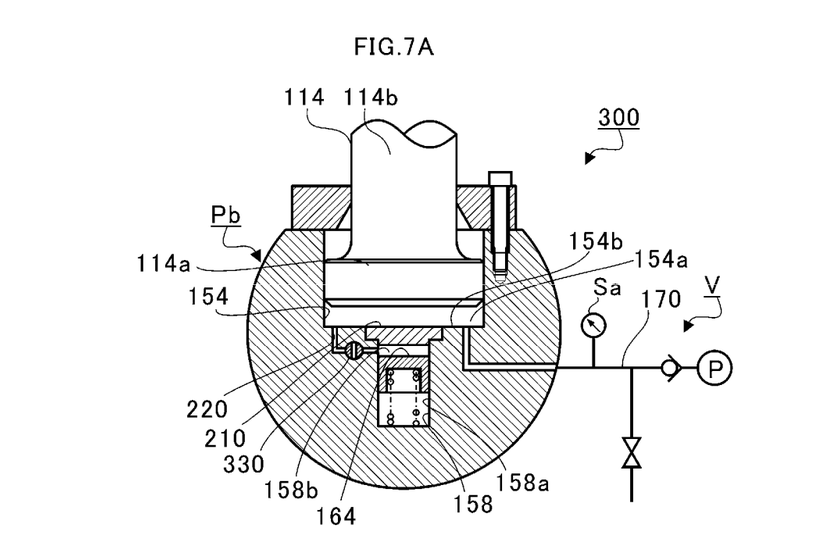
FIG. 7A and FIG. 7B are views for illustrating a second modification example.

FIG. 7A and FIG. 7B are views for illustrating a second modification example. As illustrated in FIG. 7A, in a combustion pressure suppression mechanism Pb of an engine 300 according to the second modification example, the small-diameter hole 158 is sealed by the lid member 210 as in the first modification example. The auxiliary hydraulic chamber 158*b* is defined between the partition piston 164 and the lid member 210. The another end of the communication passage 220 is opened in the side wall 158*a* of the auxiliary hydraulic chamber 158*b* on the lid member 210 side. The communication passage 220 is formed in the crosshead pin 150.

In the second modification example, unlike the first modification example, the one end of the communication passage 220 is opened in the bottom surface 154*b* of the pin hole 154. However, the one end of the communication passage 220 may be opened at the same position as that in the first modification example.

Figure 7B:
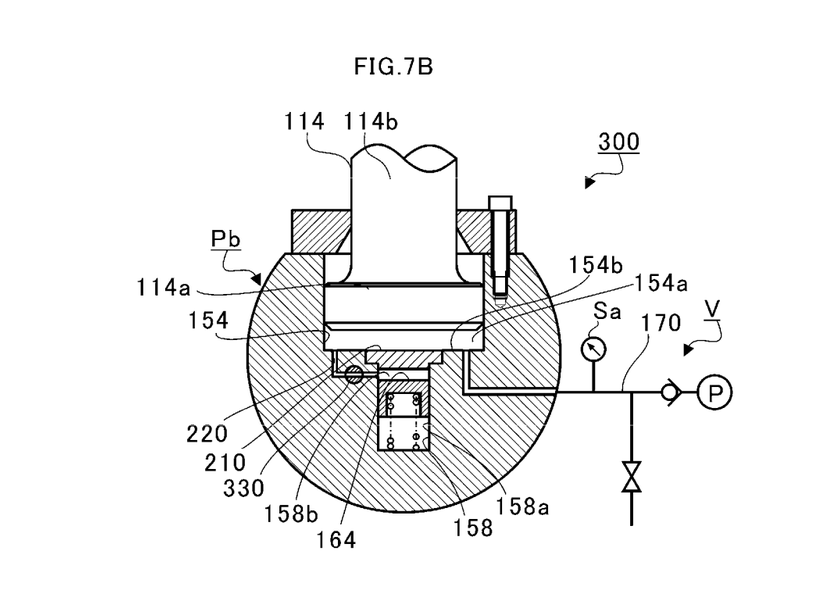

A control valve 330 is provided on the communication passage 220. The control valve 330 is, for example, an electromagnetic valve. The communication passage 220 is opened and closed by the control valve 330. As illustrated in FIG. 7A, when the control valve 330 is closed, the hydraulic chamber 154*a* and the auxiliary hydraulic chamber 158*b* do not communicate with each other. As illustrated in FIG. 7B, when the control valve 330 is opened, the hydraulic chamber 154*a* and the auxiliary hydraulic chamber 158*b* communicate with each other.

Moreover, a hydraulic pressure sensor Sa is provided on the hydraulic pipe 170. The hydraulic pressure in the hydraulic chamber 154*a* communicating with the hydraulic pipe 170 is detected by the hydraulic pressure sensor Sa.

Figure 8:
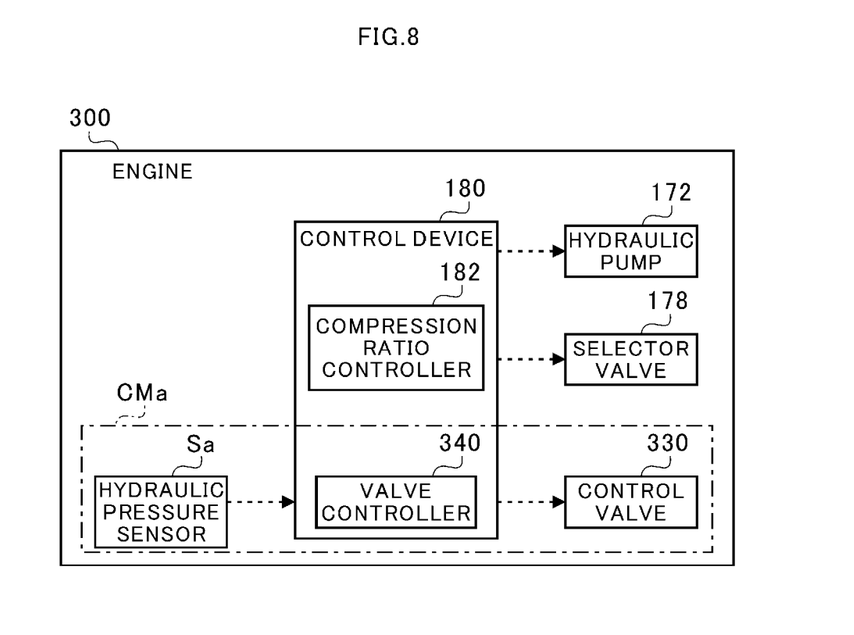
FIG. 8 is a functional block diagram for illustrating an engine.

FIG. 8 is a functional block diagram for illustrating the engine 300. In FIG. 8, a configuration relating to control for the compression ratio changing mechanism V and a communication mechanism CMa is mainly illustrated. As illustrated in FIG. 8, the engine 300 includes the communication mechanism CMa. The communication mechanism CMa includes the above-mentioned communication passage 220, hydraulic pressure sensor Sa, and control valve 330, and a valve controller 340.

The control device 180 functions as the valve controller 340 as well as the above-mentioned compression ratio controller 182. The valve controller 340 is configured to open the control valve 330 when the hydraulic pressure detected by the hydraulic pressure sensor Sa exceeds a first threshold value (threshold valve) set in advance. The valve controller 340 is configured to close the control valve 330 when the hydraulic pressure detected by the hydraulic pressure sensor Sa becomes equal to or smaller than the first threshold value.

That is, the communication mechanism CMa is configured to cause the hydraulic chamber 154*a* and the auxiliary hydraulic chamber 158*b* to communicate with each other when the hydraulic pressure in the hydraulic chamber 154*a* exceeds the first threshold value. That is, the combustion pressure suppression mechanism Pb functions when the hydraulic pressure in the hydraulic chamber 154*a* exceeds the first threshold value. Meanwhile, the communication mechanism CMa is configured to cause the hydraulic chamber 154*a* and the auxiliary hydraulic chamber 158*b* not to communicate with each other when the hydraulic pressure in the hydraulic chamber 154*a* is equal to or smaller than the first threshold value. That is, the combustion pressure suppression mechanism Pb does not function when the hydraulic pressure in the hydraulic chamber 154*a* is equal to or smaller than the first threshold value.

As described above, when the hydraulic pressure in the hydraulic chamber 154*a* exceeds the first threshold value, the maximum combustion pressure is also high. In this state, the control valve 330 is opened, thereby greatly deforming the elastic member 166, and the increase in maximum combustion pressure is thus suppressed. When the hydraulic pressure in the hydraulic chamber 154*a* is equal to or smaller than the first threshold value, the maximum combustion pressure does not decrease, and the decrease in the thermal efficiency is thus avoided. The hydraulic pressure in the hydraulic chamber 154a is more likely to change directly in accordance with the combustion pressure, and the combustion pressure suppression mechanism Pb thus appropriately functions when the maximum combustion pressure is high.

Description has been given of the case in which the control valve 330 is controlled by the valve controller 340. However, it is only required that the communication passage 220 be opened when the hydraulic pressure in the hydraulic chamber 154a exceeds the first threshold value, and that the communication passage 220 be closed when the hydraulic pressure in the hydraulic chamber 154a becomes equal to or smaller than the first threshold value. For example, a hydraulic circuit configured to operate as described above may be used.

Figure 9:
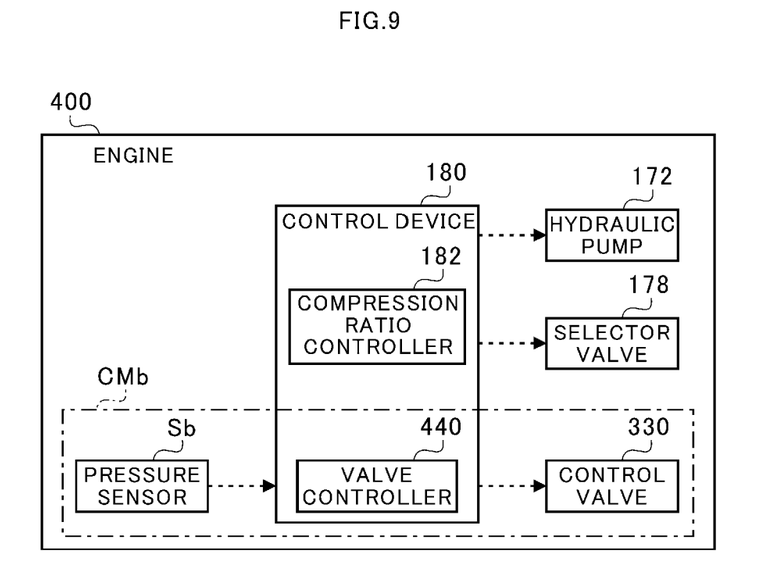
FIG. 9 is a diagram for illustrating a third modification example.

FIG. 9 is a diagram for illustrating a third modification example. As illustrated in FIG. 9, in an engine 400 according to the third modification example, a communication mechanism CMb includes a pressure sensor Sb, the control valve 330, and a valve controller 440. The pressure sensor Sb is configured to detect the pressure in the combustion chamber 128.

The control device 180 functions as the valve controller 440 as well as the above-mentioned compression ratio controller 182. The valve controller 440 is configured to open the control valve 330 when the pressure in the combustion chamber 128 detected by the pressure sensor Sb exceeds a second threshold value (threshold valve) set in advance. The valve controller 440 is configured to close the control valve 330 when the pressure in the combustion chamber 128 detected by the pressure sensor Sb becomes equal to or smaller than the second threshold value.

When the pressure in the combustion chamber 128 exceeds the second threshold value, the maximum combustion pressure is high. In this state, the control valve 330 is opened, thereby greatly deforming the elastic member 166, and the increase in maximum combustion pressure is thus suppressed as in the second modification example. When the pressure in the combustion chamber 128 is equal to or smaller than the second threshold value, the maximum combustion pressure does not decrease, and the decrease in the thermal efficiency is thus avoided. The pressure in the combustion chamber 128 is measured, and the combustion pressure suppression mechanism Pb thus appropriately functions when the maximum combustion pressure is high.

Description has been given of the case in which the control valve 330 is controlled by the valve controller 440. However, it is only required that the communication passage 220 be opened when the pressure in the combustion chamber 128 exceeds the second threshold value, and that the communication passage 220 be closed when pressure in the combustion chamber 128 becomes equal to or smaller than the second threshold value as in the second modification example. For example, a hydraulic circuit configured to operate as described above may be used.

As described in the second modification example and the third modification example, the hydraulic pressure in the hydraulic chamber 154a or the pressure in the combustion chamber 128 is used as the index value for determining whether or not to cause the hydraulic chamber 154a and the auxiliary hydraulic chamber 158b to communicate with each other.

Also in the first modification example, the second modification example, and the third modification example, a part of the combustion cycle can be brought close to the constant-pressure combustion as in the above-mentioned embodiment. As a result, the increase in combustion temperature is suppressed, thereby suppressing NOx contained in the exhaust gas. Moreover, the maximum combustion pressure is suppressed, and high strength of the members is thus not required. The increase in complexity of the structure can be suppressed compared with a case in which the hydraulic chamber 154a for the compression ratio changing mechanism V and the hydraulic chamber 154a for the combustion pressure suppression mechanism Pa or Pb are individually provided.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment and modification examples, the description is given of the engine 100, 200, 300, 400 of the two-cycle type, the uniflow scavenging type, and the crosshead type as an example. However, the type of the engine is not limited to the two-cycle type, the uniflow scavenging type, and the crosshead type. It is only required that the present disclosure be applied to an engine. The engine 100 is not limited to a marine engine, and may be an engine for, for example, an automobile.

Moreover, in the above-mentioned embodiment and modification examples, the description is given of the case in which the liquid fuel is used. However, for example, a gas fuel may be used. In this case, in addition to the fuel injection valve 142, a gas fuel injection valve is provided in a vicinity of the scavenging port 110a, or a portion of the cylinder 110 from the scavenging port 110a to the cylinder cover 124. The fuel gas is injected from the gas fuel injection valve, and then flows into the cylinder 110. When a small amount of the liquid fuel is injected from the fuel injection valve 142, a mixture of the fuel gas and active gas is ignited by combustion heat of the liquid fuel, and is then combusted. In this case, the P-V diagram is close to that of the Otto cycle instead of the Sabathe cycle shown in FIG. 5. In this configuration, the fuel gas is gasified LNG, LPG (liquified petroleum gas), light oil, heavy oil, or the like. Moreover, the engine 100 may be, for example, of a dual fuel type, which chooses a gas fuel or a liquid fuel to be used.

Moreover, in the above-mentioned embodiment and modification examples, description is given of the cases in which the partition piston 164 and the elastic member 166 are provided. However, the partition piston 164 and the elastic member 166 are not essential components. It is only required to provide at least a mechanism of changing the volume of the auxiliary hydraulic chamber 158b in accordance with the hydraulic pressure inside the auxiliary hydraulic chamber 158b.

Moreover, in the above-mentioned embodiment and modification examples, description is given of a case in which the auxiliary hydraulic chamber 158b is formed in the small-diameter hole 158 continuous with the pin hole 154. In this case, machining for forming the auxiliary hydraulic chamber 158b is easy. However, the configuration of the auxiliary hydraulic chamber 158b is not limited to the configuration in which the auxiliary hydraulic chamber 158b is formed in the small-diameter hole 158. The auxiliary hydraulic chamber 158b is only required to communicate with at least the hydraulic chamber 154a.

Moreover, in the above-mentioned embodiment and modification examples, the description is given of the case in which the hydraulic chamber 154a is provided in the crosshead pin 150 of the crosshead 116. However, the hydraulic chamber may be provided in any of the piston 112, the piston pin, and the crosshead 116. It is only required that at least the hydraulic surface of the sliding portion configured to perform the stroke motion together with the piston 112 face the hydraulic chamber.

Moreover, in the above-mentioned modification examples, description is given of the case in which the compression ratio changing mechanism V (compression ratio controller 182) is provided. However, the compression ratio changing mechanism V is not an essential configuration.

INDUSTRIAL APPLICABILITY

The present disclosure can be applied to the engine.

What is claimed is:

1. An engine, comprising:
a cylinder;
a piston accommodated in the cylinder;
a combustion chamber facing the piston;
a sliding portion configured to perform a stroke motion together with the piston;
a hydraulic surface of the sliding portion facing a side opposite to the combustion chamber;
a hydraulic chamber, which the hydraulic surface faces; and
an auxiliary hydraulic chamber, which communicates with the hydraulic chamber, and has a volume changeable in accordance with a hydraulic pressure in the hydraulic chamber.

2. The engine according to claim 1, further comprising a hydraulic pump connected to the hydraulic chamber.

3. The engine according to claim 2, further comprising:
a small-diameter hole, which receives a partition piston provided so as to be slidable, and has an interior partitioned by the partition piston into the auxiliary hydraulic chamber and an accommodation chamber; and
an elastic member configured to press the partition piston from the accommodation chamber side toward the auxiliary hydraulic chamber side.

4. The engine according to claim 3, further comprising a large-diameter hole, which accommodates the sliding portion, includes a bottom surface opposed to the hydraulic surface, and forms the hydraulic chamber between the hydraulic surface and the bottom surface,
wherein the small-diameter hole is opened in the bottom surface of the large-diameter hole.

5. The engine according to claim 1, further comprising a communication passage having one end and another end,
wherein, when a position of the sliding portion is within a predetermined range in a stroke direction, the one end is opened to the hydraulic chamber, and
wherein, when the position of the sliding portion is in a direction away from the combustion chamber with respect to the predetermined range in the stroke direction, the one end is closed, and the another end is opened to the auxiliary hydraulic chamber.

6. The engine according to claim 1, further comprising:
a communication passage having one end opened to the hydraulic chamber;
an auxiliary hydraulic chamber, to which another end of the communication passage is opened, and which has a volume changeable in accordance with a hydraulic pressure in the hydraulic chamber; and
a communication mechanism configured to cause the hydraulic chamber and the auxiliary hydraulic chamber to communicate with each other when an index value, which is the hydraulic pressure in the hydraulic chamber or a pressure in the combustion chamber, exceeds a threshold value, and to cause the hydraulic chamber and the auxiliary hydraulic chamber not to communicate with each other when the index value is equal to or smaller than the threshold value.

7. The engine according to claim 5, further comprising:
a hydraulic pump connected to the hydraulic chamber; and
a compression ratio controller configured to control the hydraulic pump, to thereby change a top dead center position of the piston.

8. The engine according to claim 6, further comprising:
a hydraulic pump connected to the hydraulic chamber; and
a compression ratio controller configured to control the hydraulic pump, to thereby change a top dead center position of the piston.

* * * * *